July 31, 1951 D. J. ORT 2,562,679
RESILIENT SADDLE MOUNTING FOR BICYCLES AND THE LIKE
Filed Feb. 18, 1946
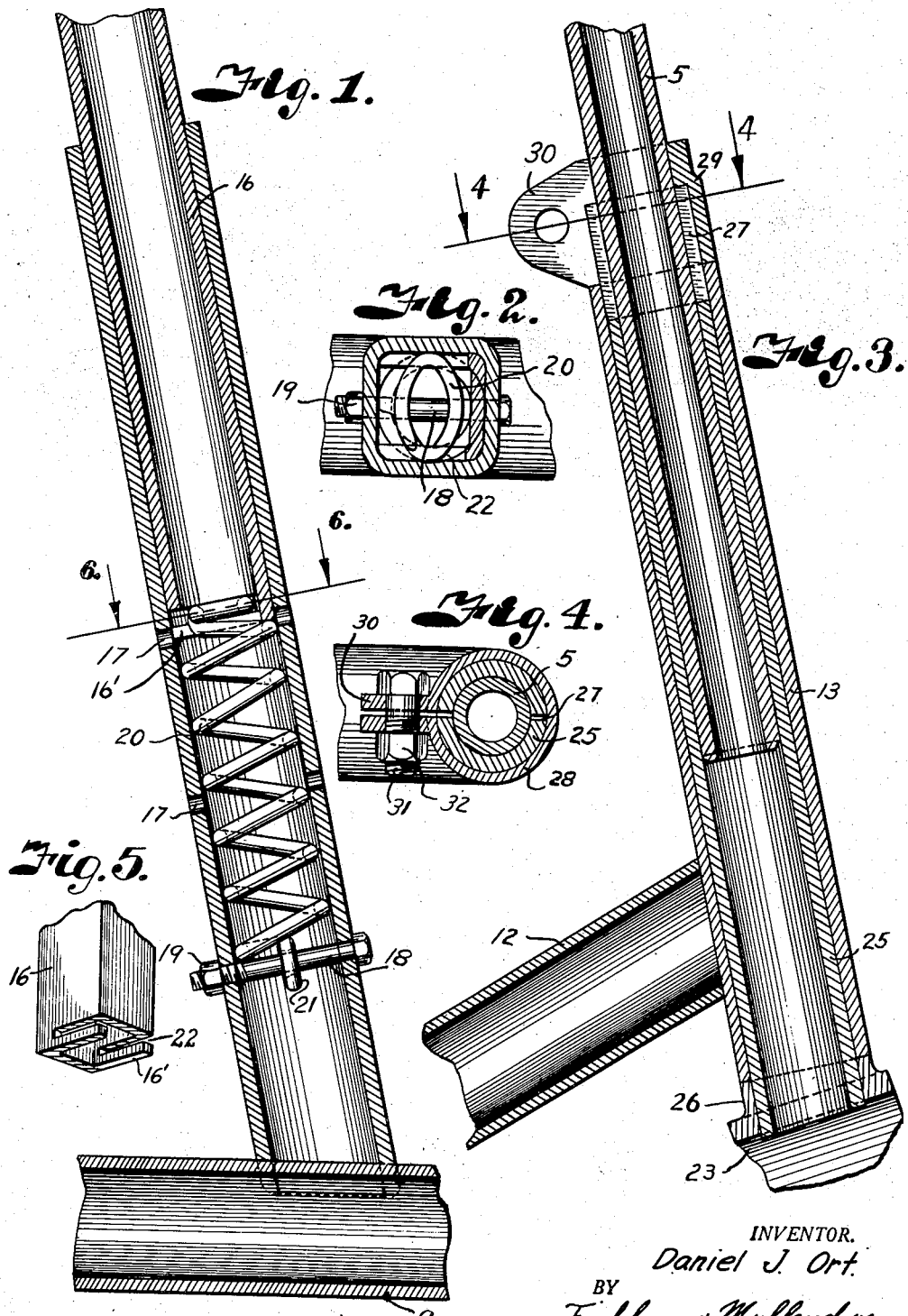
INVENTOR.
Daniel J. Ort
BY
Fishburn & Mullendore
ATTORNEYS Patented July 31, 1951

2,562,679

UNITED STATES PATENT OFFICE 2,562,679

RESILIENT SADDLE MOUNTING FOR BICYCLES AND THE LIKE

Daniel J. Ort, Wichita, Kans.

Application February 18, 1946, Serial No. 648,385

1 Claim. (Cl. 155—5.19)

This invention relates to vehicles, and more particularly to vehicles of small, two-wheel type commonly known as "bicycles."

Bicycles commonly in use are propelled by means of a sprocket and chain through the usual pedal arms attached to the frame which frequently require adjustment. With such types of bicycles it has been the custom to provide forks in the frame having various means for adjusting the axle supporting the rear wheel with respect to the sprocket arrangement. This arrangement has proven unsatisfactory due to the frequent misalignment of the rear wheel caused by the loosening of the axle therefor and adjusting it in the fork as well as requiring an unusual amount of time to make the adjustment.

The principal objects of the present invention are, therefore, to provide a bicycle of this type having a belt and pulley means for propelling the device; to provide means for easily and quickly tightening or loosening the driving belt; to provide means slidably mounted on the frame for adjusting the position of the pulley thereon.

Other objects of the present invention are to provide spring means within the standard of the seat member of the vehicle; to provide for raising and lowering of the seat member with respect to the frame of the bicycle; and to provide a device of this character which is simple, economical to manufacture and efficient in operation.

In accomplishing these and other objects of the present invention, I have provided improved details of structure, the preferred form of which is illustrated in the accompanying drawings, wherein:

Fig. 1 is a cross section through the standard for the seat particularly illustrating the spring mounted within the standard.

Fig. 2 is a cross section taken on a line 6—6, Fig. 5.

Fig. 3 is a vertical cross section showing the front fork and standard for the handle bars and its adjustment.

Fig. 4 is a cross section taken on a line 8—8, Fig. 7.

Fig. 5 is a fragmentary perspective view of the lower end of the tubular seat support showing the fingers for engaging the spring means.

Referring more in detail to the drawings:

1 designates a bicycle embodying the features of my invention comprising a frame 2, front wheel 3 and rear wheel 4, a standard 5 for handle bars 6, and a standard 7 for a seat 8. The frame 2 is made of tubing or the like and while I have here illustrated the tubing as substantially round and the seat standard 7 as substantially square, any form of tubing or other material may be utilized without departing from the spirit of my invention. The wheels 3 and 4 are preferably of the usual small rubber tire type. Any form of wheel may also be used.

The frame consists of a horizontal bar 9 having a yoke 10 rigidly secured to the rear end. The yoke 10 has openings in the rear ends of the arms adapted to receive a pin, bolt or the like 11 providing an axle for the rear wheel 4. The horizontal tube 9 has a portion 12 extending upwardly at an angle to the bar 9 which is rigidly secured to a tube 13 forming part of the standard for the handle bar secured to the tube 13. The tube 12 is welded or otherwise secured as indicated at 14.

The tube 7 is rigidly secured to the bar 9 substantially at the rear end thereof forming a standard for the seat of the vehicle. The seat 8 is rigidly secured to a tube 16 adapted to slide within the upright tube 7. The lower end of the tube has a transverse slot providing fingers 16' for a purpose later described. It will be here noted that the tube 7 is secured to the horizontal tube 9 at an angle so that the seat 8 will extend rearwardly to substantially over the rear wheel 4. The tube 7 is provided near its base with a plurality of openings 17 adapted to receive a bolt or the like 18 which may be secured to the tube 7 by the usual nut 19. Located within the upright tube 7 is a spring 20, the lower end thereof being bent to form an eye 21 for engaging the bolt 18. The upper end of the spring is flattened to engage in the slot 22 in the lower end of the tube 16 as best illustrated in Figs. 2 and 5 and over the fingers 16' formed by the slot. The spring will thus engage against the lower end of the tube 16 carrying the seat 8 as illustrated in Fig. 5. The tube 16 is adapted to reciprocate within the upright tubing 7 and has engagement with the spring 20 to provide resiliency to the seat 8. The openings 17 are provided for adjusting the elevation or height of the seat to the legs of the user of the bicycle.

From the foregoing it will be obvious that I have provided an improved spring cushion for the seat of the bicycle as well as other details of structure as above set forth.

What I claim and desire to secure by Letters Patent is:

A vehicle of the character described having a frame, a rear standard secured to said frame, a seat supported on said standard, said standard comprising telescoping tubes, the upper tube having its lower end slotted providing fingers thereon, a spring adapted to engage in the lower tube having its upper end engaging said fingers, said spring having an eye on the lower end thereof, said lower tube having a series of aligned openings therein, a bolt engaging in a pair of aligned openings in the lower tube and in the eye on the lower end of the spring for adjusting the height of said seat with respect to the frame.

DANIEL J. ORT.

REFERENCES CITED

The following references are of record in the file of this patent:

UNITED STATES PATENTS

| Number | Name | Date |
|---|---|---|
| 499,109 | Harriott | June 6, 1893 |
| 658,909 | Fraser | Oct. 2, 1900 |
| 712,580 | Norgate | Nov. 4, 1902 |

FOREIGN PATENTS

| Number | Country | Date |
|---|---|---|
| 73,876 | Germany | Mar. 12, 1894 |
| 163,873 | Great Britian | June 2, 1921 |
| 841,330 | France | Feb. 1, 1939 |
| 530,922 | France | Oct. 12, 1921 |